US011496908B2

(12) United States Patent
Cui et al.

(10) Patent No.: US 11,496,908 B2
(45) Date of Patent: Nov. 8, 2022

(54) APPARATUSES AND METHODS FOR ENHANCING NETWORK COVERAGE IN ACCORDANCE WITH PREDICTIONS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Johns Creek, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 193 days.

(21) Appl. No.: 16/902,485

(22) Filed: Jun. 16, 2020

(65) Prior Publication Data

US 2021/0392510 A1 Dec. 16, 2021

(51) Int. Cl.
*H04W 16/18* (2009.01)
*G06N 5/04* (2006.01)
*H04W 84/18* (2009.01)

(52) U.S. Cl.
CPC .............. *H04W 16/18* (2013.01); *G06N 5/04* (2013.01); *H04W 84/18* (2013.01)

(58) Field of Classification Search
CPC .......... G01S 1/02; H04H 60/90; H04W 24/02
USPC .......................... 455/423; 370/254, 218, 338
See application file for complete search history.

(56) References Cited

U.S. PATENT DOCUMENTS

2016/0029430 A1* 1/2016 Mishra ................. H04B 17/309
370/254
2018/0063726 A1* 3/2018 Shackleton ........... H04W 40/08

* cited by examiner

*Primary Examiner* — Kiet M Doan
(74) *Attorney, Agent, or Firm* — Guntin & Gust, PLC; Robert Gingher

(57) ABSTRACT

Aspects of the subject disclosure may include, for example, generating, at a first point in time, a first prediction regarding a likelihood that a communication device will attempt to connect to a service of a network at a second point in time that is subsequent to the first point in time, generating, at a third point in time that is prior to the second point in time, a second prediction regarding a scope of coverage of the network at the second point in time, and generating, by the processing system, a first ad-hoc network, modifying, by the processing system, a parameter of a second ad-hoc network, or a combination thereof, in accordance with the first prediction and the second prediction to extend the scope of coverage. Other embodiments are disclosed.

20 Claims, 8 Drawing Sheets

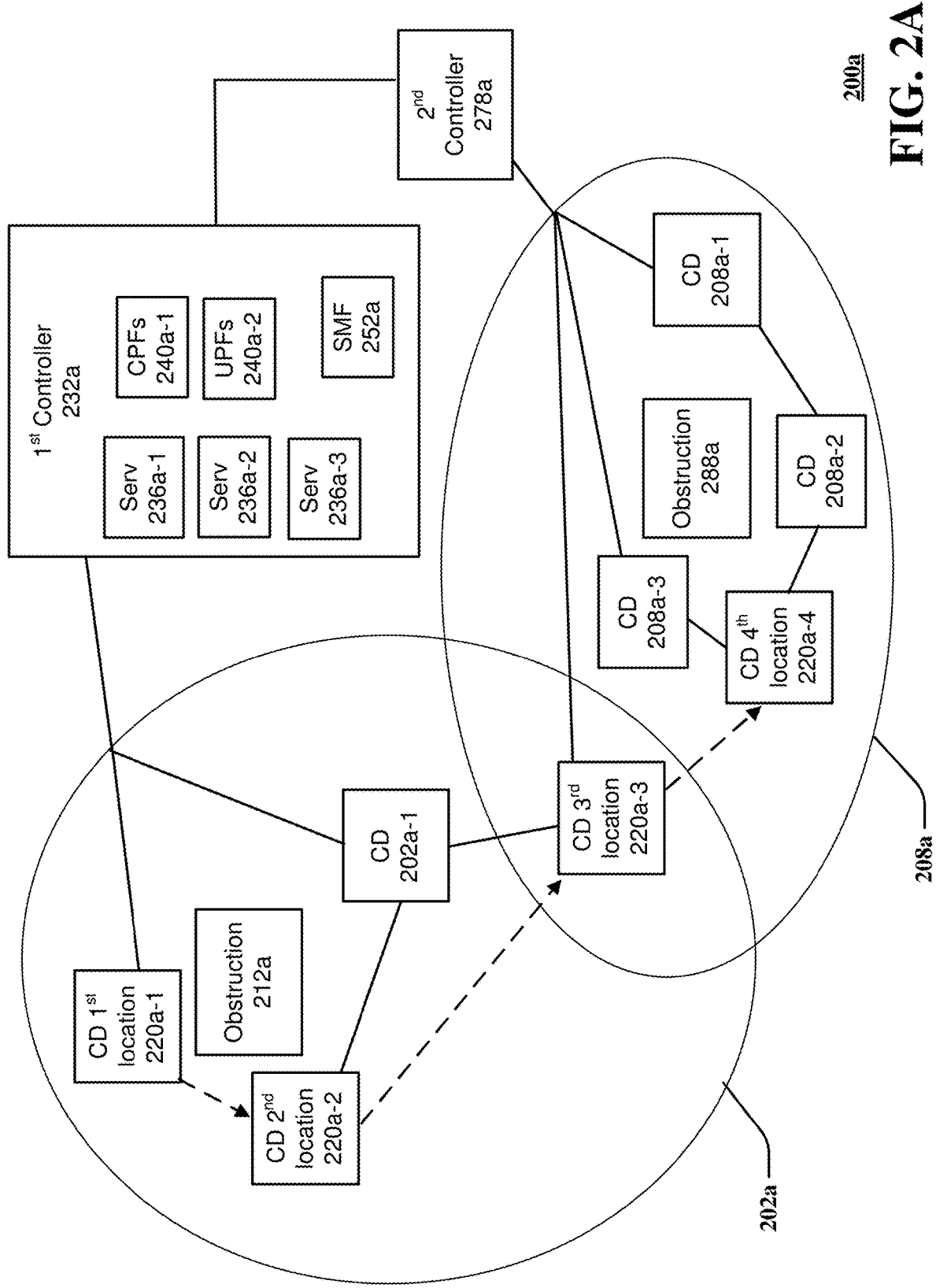

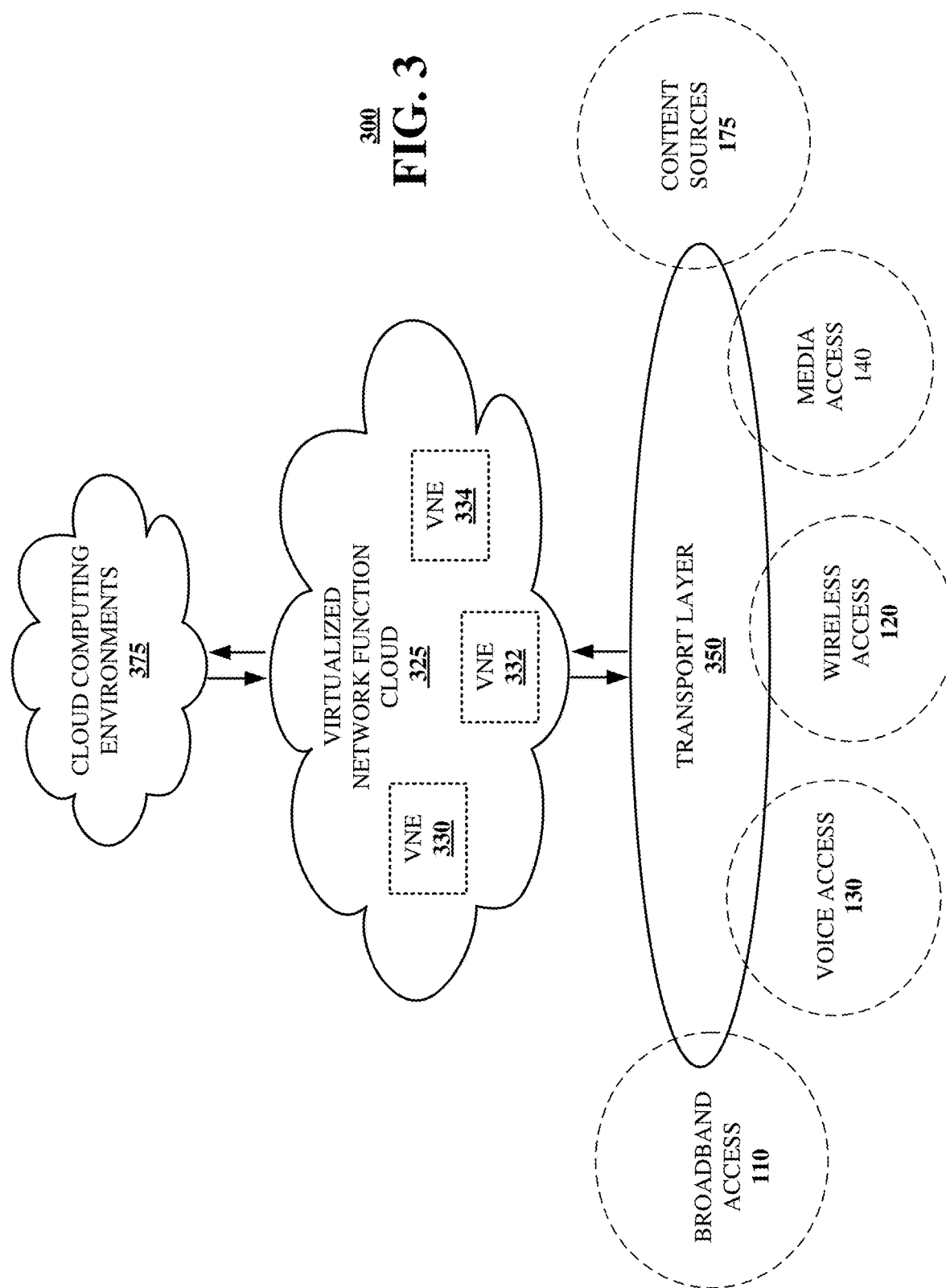

APPARATUSES AND METHODS FOR ENHANCING NETWORK COVERAGE IN ACCORDANCE WITH PREDICTIONS

FIELD OF THE DISCLOSURE

The subject disclosure relates to apparatuses and methods for enhancing network coverage in accordance with predictions.

BACKGROUND

Network operators continue to enhance a scope of geographical coverage that is available via a deployment of additional resources. For example, as access technology evolves from one generation to the next, the geographical area/region that is covered continues to expand. With that expansion, additional opportunities are being generated/created in terms of providing network services to users. However, the geographical range of coverage associated with the additional resources is trending to ever-smaller values (e.g., on the order of approximately one hundred meters to a few hundred meters). As a result, there may be instances of holes or gaps in the coverage. Such holes/gaps may be manifested in degraded network service, which can detract from quality of service (QoS) or quality of experience (QoE). In some cases, the holes or gaps in the coverage may result in a loss of network connectivity.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for extending a scope of coverage associated with one or more networks. Other embodiments are described in the subject disclosure.

One or more aspects of the subject disclosure include obtaining first data and second data, analyzing the first data to identify a gap in a coverage of a network, analyzing the second data to generate a first prediction regarding a likelihood of a first communication device engaging in a communication session in an area coinciding with the gap, determining, in accordance with the first prediction, that the likelihood is greater than a first threshold, and generating, in accordance with the determining that the likelihood is greater than the first threshold, a first ad-hoc network to extend the coverage to the area.

One or more aspects of the subject disclosure include processing first data to identify a coverage within an area of a network that is likely to be less than a first threshold at a first point in time, resulting in a first identification, processing second data to identify an application that is likely to be executed by a user equipment in the area at the first point in time in an amount that is greater than a second threshold, resulting in a second identification, and generating a first ad-hoc network to extend the coverage in accordance with the first identification and the second identification.

One or more aspects of the subject disclosure include generating, at a first point in time, a first prediction regarding a likelihood that a communication device will attempt to connect to a service of a network at a second point in time that is subsequent to the first point in time, generating, at a third point in time that is prior to the second point in time, a second prediction regarding a scope of coverage of the network at the second point in time, and generating, by the processing system, a first ad-hoc network, modifying, by the processing system, a parameter of a second ad-hoc network, or a combination thereof, in accordance with the first prediction and the second prediction, to extend the scope of coverage.

Figure 1:
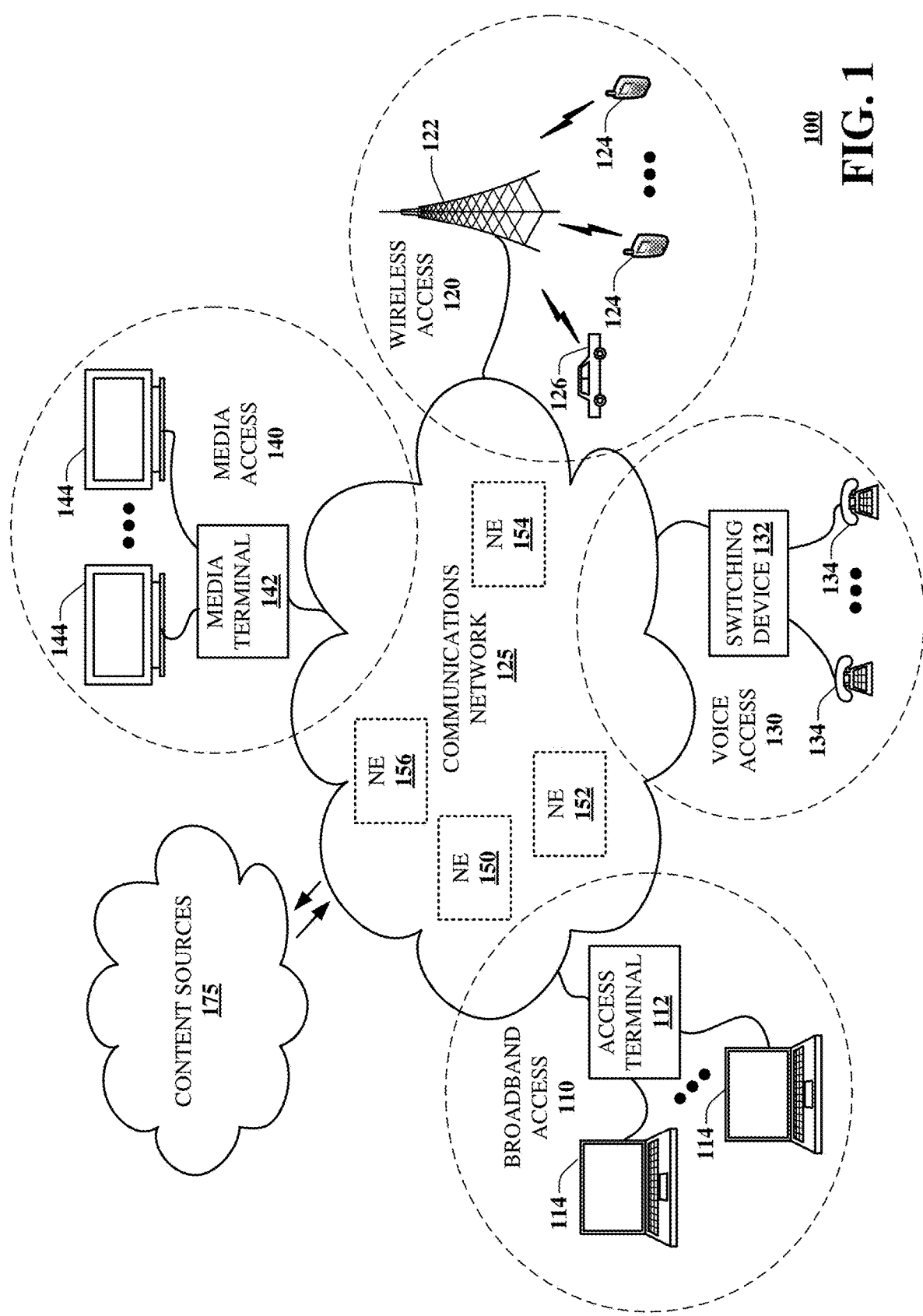
FIG. 1 is a block diagram illustrating an exemplary, non-limiting embodiment of a communication network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part obtaining first data and second data, analyzing the first data to identify a gap in a coverage of a network, analyzing the second data to generate a first prediction regarding a likelihood of a first communication device engaging in a communication session in an area coinciding with the gap, determining, in accordance with the first prediction, that the likelihood is greater than a first threshold, and generating, in accordance with the determining that the likelihood is greater than the first threshold, a first ad-hoc network to extend the coverage to the area. Communications network 100 can facilitate in whole or in part processing first data to identify a coverage within an area of a network that is likely to be less than a first threshold at a first point in time, resulting in a first identification, processing second data to identify an application that is likely to be executed by a user equipment in the area at the first point in time in an amount that is greater than a second threshold, resulting in a second identification, and generating a first ad-hoc network to extend the coverage in accordance with the first identification and the second identification. Communications network 100 can facilitate in whole or in part generating, at a first point in time, a first prediction regarding a likelihood that a communication device will attempt to connect to a service of a network at a second point in time that is subsequent to the first point in time, generating, at a third point in time that is prior to the second point in time, a second prediction regarding a scope of coverage of the network at the second point in time, and generating, by the processing system, a first ad-hoc network, modifying, by the processing system, a parameter of a second ad-hoc network, or a combination thereof, in accordance with the first prediction and the second prediction to extend the scope of coverage.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, 6G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, 6G, or higher generation modem, an optical modem and/or other access devices.

In various embodiments, the base station or access point 122 can include a 4G, 5G, 6G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a functioning within, or operatively overlaid upon the communication network/system 100 of FIG. 1 in accordance with various aspects described herein. The system 200a may be operative to selectively generate/create, reorganize/modify, and/or discard/destroy/disband one or more ad-hoc networks. In FIG. 2A, two ad-hoc networks are represented, e.g., a first ad-hoc network represented by a first cluster 202a and a second ad-hoc network represented by a second cluster 208a.

The arrangement of the system 200a may be dynamic in nature, and may adapt in response to, e.g., one or more user-generated inputs (or a lack thereof), an occurrence of one or more events (or a lack thereof), one or more conditions (or a lack thereof), etc. In this respect, and to demonstrate such adaptations, a mobile communication device (CD) is shown in FIG. 2A in terms of a progression associated with changes in geographical location over time. In particular, a mobile CD is shown at four different locations coinciding with reference characters 220a-1, 220a-2, 220a-3, and 220a-4 at four different points in time. Operations of the system 200a in accordance with each of those four locations 220a-1 through 220a-4 are described in further detail below.

It is noted that changes in geographical location are illustrative of a factor/parameter that may cause an adaptation to/within the system 200a. Other factors that may cause adaptations may include, without limitation, changes in intra-cell or inter-cell interference, noise, changes in power (e.g., battery) levels, network traffic/loads, an identification of types of services (e.g., communication sessions) being provided, an identification of device types/capabilities (potentially as part of a make, model, and/or serial number of a given device), etc. In some embodiments, a combination of two or more factors may influence or cause adaptations to/within the system 200a.

When the mobile CD is at the first location 220a-1, the mobile CD may obtain service directly from a first controller 232a. In some embodiments, the first controller 232a may be representative of, or include, aspects of a mobile edge computing (MEC) device. The use of MEC devices, in relation to a provisioning of access to one or more networks (or services thereof), is described in U.S. patent application Ser. No. 16/699,880 filed on Dec. 2, 2019, and U.S. patent application Ser. No. 16/699,987 filed on Dec. 2, 2019. All sections of each of the aforementioned patent applications are incorporated herein by reference in their entirety.

In some embodiments, the first controller 232a may be included as part of one or more devices of a peer-to-peer network and/or as part of a distributed computing/processing system. The first controller 232a may be referred to as, or incorporate aspects of, a radio intelligent controller (RIC).

The services available to the mobile CD from the first controller 232a may include a first service (Serv) 236a-1, a second service 236a-2, and/or a third service 236a-3. The services 236a-1 through 236a-3 may be associated with one or more programs and/or applications that may be at least partially executed by the mobile CD. One or more of the services 236a-1 through 236a-3 may be administered/stored/maintained by the first controller 232a, potentially as part of one or more data storage devices (e.g., a database, a memory, etc.), as a micro-service.

The direct provisioning of service to the mobile CD (from/via the first controller 232a) when the mobile CD is at the first location 220a-1 as described above may be based on an analysis of one or more of the factors described above. For example, the first location 220a-1 may be geographically proximal to (e.g., may be within a threshold distance of) the first controller 232a and/or may be indicative of a direct line-of-sight (LOS) between the mobile CD and the first controller 232a.

As the mobile CD transitions from the first location 220a-1 to the second location 220a-2, a quality parameter (e.g., a received signal strength, a signal-to-noise-ratio, a signal-to-noise plus interference ratio, etc.) associated with the service that is provisioned from/via the first controller 232a may degrade/decrease from a first value/level to a second value/level. For example, the degradation/decrease may be a result of the second location 220a-2 being further from the first controller 232a than the first location 220a-1 and/or may be a result of an obstruction 212a in the LOS between the mobile CD and the first controller 232a. Any of the aforementioned factors, taken alone or in combination, may contribute to the degradation/decrease.

In order to counteract the degradation/decrease in the quality parameter in terms of the transition of the mobile CD from the first location 220a-1 to the second location 220a-2, a first ad-hoc network associated with the first cluster 202a may be generated/created. For example, a CD 202a-1 may be invoked/engaged as part of that first ad-hoc network/cluster 202a, where the CD 202a-1 may function, or be operative, as a repeater or range-extender of the coverage provided to the mobile CD at the second location 220a-2 via the first controller 232a. Stated slightly differently, the mobile CD may indirectly obtain network services from the first controller 232a at the second location 220a-2 via the CD 202a-1. In this regard, the CD 202a-1 may function as an intermediary between the first controller 232a and the mobile CD when the mobile CD is at, or near, the second location 220a-2.

The CD 202a-1 may be a fixed/stationary device. The CD 202a-1 may be a mobile device. The CD 202a-1 may include, without limitation, one or more servers, desktop computers, laptop computers, tablets, gateways, routers, switches, modems, mobile phones (e.g., smartphones), Internet of Things (IoT) devices, cameras, sensors, etc., or any combination thereof.

As the mobile CD transitions from the second location 220a-2 to the third location 220a-3, a quality parameter associated with the service that is provisioned from/via the first controller 232a may degrade/decrease from the second value/level to a third value/level. For example, and despite the fact that the obstruction 212a might not serve as an obstruction in terms of the LOS between the mobile CD and the first controller 232a when the mobile CD is at the third location 220a-3, the mobile CD may be so far away from the first controller 232a that the QoS at the third location 220a-3 is very poor (e.g., is less than a threshold). In this respect, the mobile CD may continue to receive at least part of one or more network services indirectly from the first controller 232a via the CD 202a-1 when the mobile CD is at, or near, the third location 220a-3.

In some embodiments, when the mobile CD is at the third location 220a-3, the mobile CD may directly obtain at least part of the network services (e.g., the service 236a-1) from a second controller 278a. In this respect, a sharing of the responsibility for provisioning network services to the mobile CD may facilitate load balancing as between the first controller 232a and the second controller 278a.

The first controller 232a and/or the second controller 278a may oversee/manage aspects of resource congestion and/or resource availability, potentially as a function of traffic/load experienced in the system 200a. In this regard, the first controller 232a and/or the second controller 278a may be responsible for selecting particular devices or components to provision aspects of a given service (e.g., the first service 236a-1) with respect to one or more of the CDs of the system 200a.

The first controller 232a and the second controller 278a may be coupled (e.g., communicatively coupled) to one another via backhaul/backend infrastructure, such as one or more cables, trunks, wires, conductors, etc. In some embodiments, the first controller 232a and the second controller 278a may be coupled (e.g., communicatively coupled) to one another via one or more wireless links.

In some embodiments, the parts/portions of the network services provisioned to the mobile CD by the first controller 232a and the second controller 278a may adhere/conform to different radio access technologies (RATs). For example, the first controller 232a may provision a first part/portion of the network services via a first RAT, and the second controller may provision a second part/portion of the network services via a second RAT that is different from the first RAT. In some embodiments, the mobile CD may support multiple, simultaneous connections/sessions via multiple RATs.

As the mobile CD transitions from the third location 220a-3 to the fourth location 220a-4, the mobile CD may be geographically distant from the scope of coverage associated with the first controller 232a and/or the first cluster 202a. In this respect, when the mobile CD is located at, or is transitioning to, the fourth location 220a-4, the first cluster 202a may be discarded/destroyed/disbanded. For example, as part of disbanding the first cluster 202a the CD 202a-1 may be placed in a low or reduced operating state (e.g., may be powered-off, in whole or in part) in order to conserve resources (e.g., power (battery), bandwidth, etc.).

As the mobile CD transitions from the third location 220a-3 to the fourth location 220a-4, a quality parameter/metric (e.g., a received signal strength, a signal-to-noise-ratio, a signal-to-noise plus interference ratio, etc.) associated with the service that is provisioned from/via the second controller 278a may degrade/decrease. For example, when the mobile CD is at, or proximal to, the fourth location 220a-4, an obstruction 288a in the LOS between the second controller 278a and the mobile CD may cause a degradation in terms of the quality parameter.

In order to counteract the degradation/decrease in the quality parameter in terms of the transition of the mobile CD from the third location 220a-3 to the fourth location 220a-4, a second ad-hoc network associated with the second cluster 208a may be generated/created. For example, CDs 208a-1, 208a-2, and 208a-3 may be invoked as part of the second ad-hoc network/cluster 208a, where the CDs 208a-1 through 208a-3 may function, or be operative, as repeaters or range-extenders of the coverage provided to the mobile CD at the fourth location 220a-4 via the second controller 278a. Stated slightly differently, the mobile CD may indirectly obtain network services from the second controller 278a at the fourth location 220a-4 via the CDs 208a-1 through 208a-3. In this regard, the CDs 208a-1 through 208a-3 may function as intermediaries between the second controller 278a and the mobile CD when the mobile CD is at, or near, the fourth location 220a-4.

In the exemplary system 200a of FIG. 2A, when the mobile CD is at the fourth location 220a-4, the mobile CD may obtain a first part of a service from the controller 278a via the CD 208a-3 and obtain a second part of the service from the controller 278a via the CD 208a-1 and the CD 208a-2. As part of the second ad-hoc network/cluster 208a, the CDs 208a-1 and 208a-2 may be arranged serially/sequentially (as between the second controller 278a and the mobile CD at, e.g., the fourth location 220a-4), and that serial/sequential combination of CDs may be arranged in parallel relative to the CD 208a-3.

Thus, as described above, aspects of the system 200a may facilitate a provisioning of one or more services to a CD (e.g., a mobile CD). For example, as part of provisioning service to a CD, one or more ad-hoc networks/clusters/sub-networks may be generated/created and/or disbanded/destroyed in response to one or more inputs, events, conditions, etc. Values for parameters (e.g., transmission power levels, modulation/demodulation schemes, multiple-input multiple-output (MIMO) schemes, encryption/decryption schemes, etc.) associated with a given ad-hoc network/cluster may be assigned and/or modified in accordance with one or more inputs, event, conditions, etc. In this regard, ad-hoc networks/clusters, and one or more parameters associated therewith, may be tailored/customized dynamically/on-the-fly in order to meet/satisfy one or more constraints, requirements, and/or specifications. Such tailoring/customization may be obtained in real-time (or substantially in real-time), which can be useful or beneficial in terms of maintaining a threshold QoS/QoE and/or maintaining network connectivity. Stated slightly differently, such tailoring/customization may assist in enhancing user satisfaction and/or avoiding degraded service, such as a premature loss of connectivity (e.g., a premature termination of a service or communication session).

The first controller 232a may manage functionality of the system 200a in terms of control plane functions (CPFs) 240a-1 and/or user plane functions (UPFs) 240a-2. For example, the CPFs 240a-1 may incorporate aspects of service level agreements (SLAs), billing, application interfaces (AIs), code exchange technologies, etc. The UPFs 240a-2 may be responsible for obtaining and transferring content/information/data associated with applications executing on a CD, such as the mobile CD described above.

The first controller 232a may include, or be associated with, a network session management function (nSMF, or SMF for short) 252a. The SMF 252a may be responsible for managing/maintaining a first communication session (associated with a requested service) with a given CD, such as the mobile CD described above.

While the CPFs 240a-1, UPFs 240a-2, and the SMF 252a are shown in FIG. 2A as being located in/at the first controller 232a, in some embodiments the CPFs 240a-1, UPFs 240a-2, and/or the SMF 252a may be wholly or partially located at/within the second controller 278a. In some embodiments, the second controller 278a may have its own corresponding CPFs 240a-1, UPFs 240a-2, and/or SMF 252a, which is to say that unique instances of CPFs, UPFs, and/or SMFs may be located at the first controller 232a and the second controller 278a in some embodiments.

As described above, in terms of a provisioning of one or more services (e.g., services 236a-1 through 236a-3) the system 200a may adapt in response to one or more inputs, events, conditions, etc. In some embodiments, such adaptations may be based, at least in part, on a prediction of an occurrence (or a lack thereof) of such inputs, events, and/or conditions. For example, if the system 200a is able to predict that an occurrence of an event or a condition (at some point in the future) will likely have a negative impact on QoS or QoE (potentially as a function of one or more thresholds), the system 200a may adapt (e.g., may generate one or more ad-hoc networks, may change a parameter associated with an ad-hoc network, etc.) in advance of the occurrence of the event/condition in an effort to reduce an amount or extent of the impact of that event or condition on QoS/QoE. In this respect, and referring to FIG. 2B, a system 200b is shown that may be utilized to obtain such a reduction.

The system 200b may be operatively included within, or overlaid upon, one or more portions of the system 200a of FIG. 2A. For example, the system 200b may be included as part of a controller (e.g., the first controller 232a) and/or a service (e.g., the service 236a-1). The system 200b may include a statistical database (DB) 204b, an artificial intelligence (AI)/machine learning (ML) component 210b, a manager 216b, and an inter drop call identification subsystem (iDCIS) 222b.

The statistical DB 204b may aggregate and record data from one or more sources, such as for example measurements/metrics pertaining to communication sessions within the system 200a. For example, the data may include information pertaining to a number of communication sessions that were prematurely terminated (e.g., dropped voice calls), values for QoS parameters (e.g., received signal strengths, signal-to-noise ratios, signal-to-interference plus noise ratios, etc.), numbers of retries/failed attempts on the part of a CD to connect to a network or service, etc.

In some embodiments, the sources that provide data to the statistical DB 204b may include imagery obtained from one or more satellites, users (e.g., user accounts on social media platforms), messages (e.g., emails), etc. For example, such imagery may include within it (representations of) the obstructions 212a and 288a of FIG. 2A. The imagery may be processed in accordance with one or more image processing algorithms to identify the obstructions.

In some embodiments, the sources that provide data to the statistical DB 204b may include one or more snoopers or probes that may monitor network traffic. For example, the probes may identify a type of application or communication session in accordance with one or more tags or labels applied to the network traffic.

In some embodiments, the sources of data in respect of the statistical DB 204b may include a schedule or calendar of a user, representative of where the user is likely to go at various points in the future, what kinds/types of communication sessions and/or devices the user is likely to utilize, etc. In some embodiments, the user may transmit or receive one or more messages that may identify dates/times regarding locations/areas where the user plans to be present in the future.

The AI/ML component 210b may analyze the data from the statistical DB 204b to identify/predict whether there is likely to be any holes/gaps in the coverage of the network/system 200a. As the name/nomenclature implies, the AI/ML component 210b may incorporate aspects of artificial intelligence and/or machine learning to identify when and/or where such holes/gaps in coverage are likely to occur, and a degree or extent to which a given hole/gap is likely to manifest itself with respect to a given user and/or a given device. To illustratively demonstrate the latter point of the degree/extent of a hole/gap, a given hole/gap may be such that a CD located within the hole/gap may be able to send and receive text messages, but may be unable to maintain sufficient connectivity to facilitate a smooth playback associated with a streaming video application. In this respect, a hole/gap might not coincide with a complete/full loss of connectivity or service, but may be representative of a degraded/decreased level of connectivity or service. The extent of a hole/gap may be based on, or specified in accordance with, one or more thresholds. To demonstrate, a hole/gap may coincide with an area or region in which a measured QoS parameter, a measured received signal strength indicator/indication, etc., is less than a predetermined threshold. In some embodiments, a hole/gap may be based on a comparison with expected and/or desired threshold values.

Based on the identifications/predictions of the AI/ML component 210b, the manager 216b may invoke one or more actions to blunt/mitigate the impact of a potential hole/gap in coverage or service provided to one or more CDs. For example, the manager 216b may reassign a first communication session associated with a first CD from a first frequency band to a second frequency band in order to provision/allocate spectrum for use by a second CD as part of a second communication session. Other types of actions, such as for example changing a transmission power level, changing an encryption/decryption scheme, changing a modulation/demodulation scheme, changing a MIMO scheme, invoking/engaging and/or destroying/disbanding a cluster/ad-hoc network, etc., may be ordered/invoked by the manager 216b in accordance with the identifications/predictions of the AI/ML component 210b.

In some instances, solutions/changes provided by the manager 216b may be insufficient for obtaining/achieving/realizing a given QoS or QoE. In this respect, in some embodiments the manager 216b may coordinate (alone, or in combination with the AI/ML component 210b), alternative or additional solutions/changes with the iDCIS 222b. For example, the iDCIS 222b may coordinate changes with another iDCIS (not shown in FIG. 2B). The communication between the iDCIS 222b and the another iDCIS may help to facilitate network or system-wide solutions, which is to say that a given solution may be sufficient (e.g., optimal) for a particular controller, sub-network or service, but may be insufficient (e.g. sub-optimal) on a broader level (e.g., in respect of other controllers, sub-networks, and/or services). In this regard, changes/solutions within a given controller, sub-network, or service may be coordinated amongst other controllers, sub-networks, and/or services.

Figure 2B:
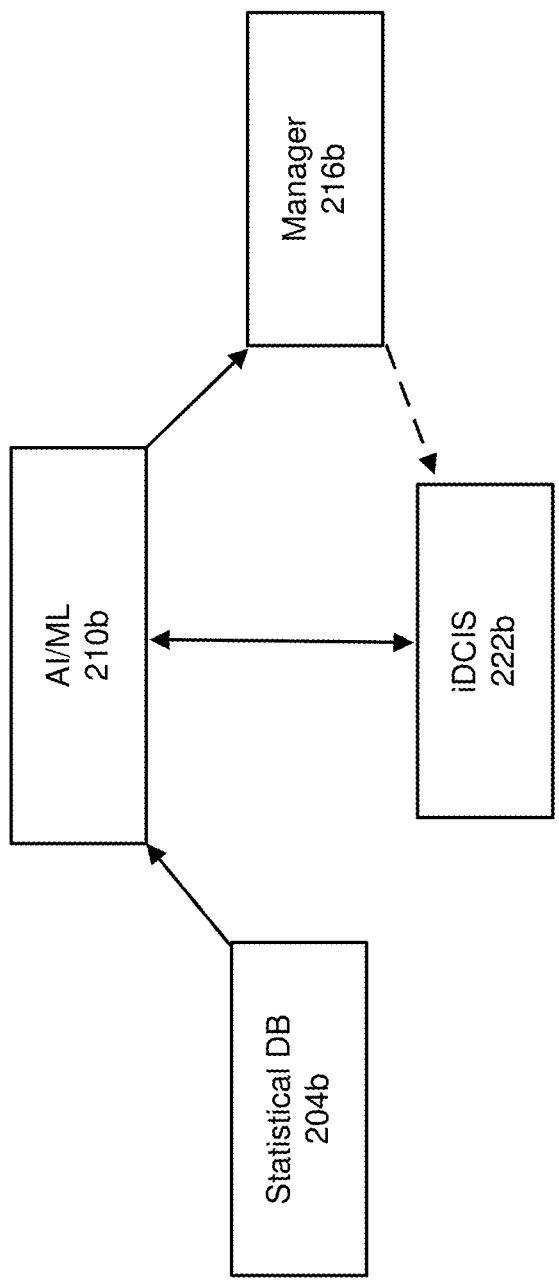
FIG. 2B is a block diagram illustrating an example, non-limiting embodiment of a system functioning within the system of FIG. 2A in accordance with various aspects described herein

Thus, as described above, aspects of the systems 200a and 200b of FIGS. 2A-2B may be used to selectively invoke a resource (e.g., a CD, a cluster/ad-hoc network, etc.) to extend or boost coverage associated with a network or a service. By generating a prediction regarding whether any gaps/holes in coverage are likely to exist (as well as a degree of confidence in the prediction, as potentially represented by one or more scores), resources may be adjusted/allocated/managed in an effort to reduce, or even completely eliminate, the impact from such gaps/holes.

Figure 2C:
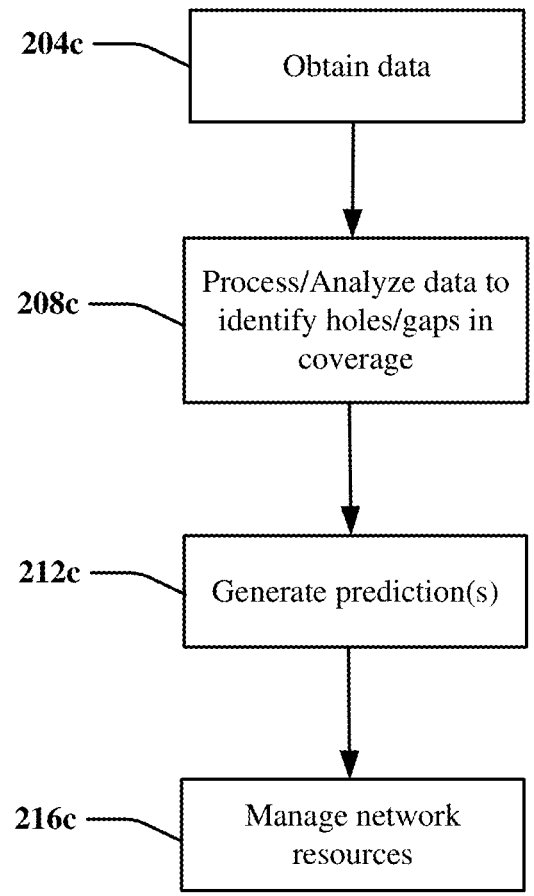
FIG. 2C depicts an illustrative embodiment of a method in accordance with various aspects described herein.

Referring now to FIG. 2C, an illustrative embodiment of a method 200c in accordance with various aspects described herein is shown. The method 200c may be implemented/executed, in whole or in part, in conjunction with one or more systems, devices, and/or components, such as for example the systems, devices, and components described herein. The method 200c may be used to extend a scope of coverage associated with one or more networks.

In block 204c, data associated with one or more networks may be obtained. For example, the data of block 204c may include real-time data and/or historical data related to communication sessions associated with the network(s). The data of block 204c may include data from one or more of the sources described above in respect of the statistical DB 204b of FIG. 2B.

In block 208c, the data of block 204c may be processed/analyzed to identify areas or regions where network coverage is poor (e.g., is less than a threshold). For example, the processing/analysis of block 208c may identify areas or regions that are prone to having communication sessions (e.g., voice calls, videoconferences, streaming audio/video sessions, etc.) terminated prematurely. The processing/analysis of block 208c may identify an extent or degree to which the network coverage is degraded, and one or more factors/parameters that may contribute to the degraded levels of network coverage, such as for example obstructions in a LOS, communication device capabilities (or, analogously, shortcomings), etc.

In block 212c, the data of block 204c may be processed/analyzed to generate one or more predictions. For example, as part of block 212c a prediction may be generated regarding a likely location of a user and/or a CD at one or more points in time and/or communication sessions or applications that are likely to be utilized/executed at the one or more points in time. The prediction(s) of block 212c may include a prediction regarding interference levels or noise levels (modeled as, e.g., a random variable) that are likely to be experienced in the network(s). As part of block 212c, a degree of confidence associated with one or more of the predictions may be generated. The degree of confidence may be represented as/by one or more scores.

In block 216c, network resources may be managed in accordance with the processing/analysis of block 208c and/or the prediction(s)/degrees of confidence of block 212c. For example, as part of block 216c, one or more ad-hoc networks/clusters/sub-networks may be generated/created and/or discarded/disbanded/destroyed. In some embodiments, block 216c may include adding a CD to a first ad-hoc network and/or removing a CD from a second ad-hoc network. As part of block 216c, one or more parameters (e.g., transmission power levels, frequency bands, modulation/demodulation schemes, encryption/decryption schemes, MIMO schemes, RAT schemes, etc.) associated with one or more CDs may be selected, assigned, and/or updated/modified. The management of network resources as part of block 216c may include a determination whether a CD is likely to engage in a communication session in an area coinciding with a gap in coverage (in an amount greater than a threshold), and if so, allocating resources in accordance with that determination.

In conjunction with block 216c, network resources may be allocated to those areas or regions of the network(s) where CDs of users are likely to be located (in accordance with the prediction(s) of block 212c). Stated slightly differently, and assuming all other conditions being equal, holes or gaps in coverage may be allowed to persist if the number of users/CDs in the associated areas/regions is predicted to be small (e.g., less than a threshold). For example, from the perspective of a network operator or service provider, network resources may be allocated to obtain their most efficient use (to avoid excessive, unnecessary, or inefficient capital expenditures). However, if the conditions or circumstances warrant, network resources may be allocated to provide approximately 100% coverage in some embodiments. For example, in relation to a life-saving application or mission (e.g., a dispatching of first responders to a remote location, such as the wilderness, to rescue an injured hiker), it may be prudent to ensure reliable network coverage/connectivity over the entire scope of the mission.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The method 200c may be executed as part of one or more algorithms, such as for example an artificial intelligence and/or a machine learning based algorithm. One or more aspects of the method 200c may be executed iteratively/repeatedly in order to refine the output(s) of the method 200c (where the output(s) may include resource allocations associated with block 216c). As the method 200c is used, the outputs of the method 200c may tend to converge to their best or optimum values, which is to say that any error in the outputs may tend to decrease/diminish over time.

Aspects of this disclosure may be used to extend a scope of coverage associated with one or more networks, such as for example a 6G network. Aspects of the disclosure may be utilized to realize a high degree of throughput, even in areas or regions that might otherwise suffer from gaps or holes in coverage. Aspects of the disclosure may facilitate the use of a variety of technologies, such as for example three-dimensional (3D) imaging and sensing applications, autonomous vehicle operations, extended reality/cross-reality applications, surveying applications, etc. Such technologies may be characterized by a rich data/feature set, which may in turn lead to high levels of QoS and/or QoE.

As described above, aspects of this disclosure may facilitate the use of one or more CDs as relay devices or extenders to dynamically form and/or destroy one or more ad-hoc networks/clusters/sub-networks. A control and management of such CDs may facilitate an extension or enhancement of network coverage and services, while at the same time avoiding unnecessary resource deployments/utilizations/allocations.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the systems 200a and 200b, and the method 200c presented in FIGS. 1 and 2A-2C. For example, virtualized communication network 300 can facilitate in whole or in part obtaining first data and second data, analyzing the first data to identify a gap in a coverage of a network, analyzing the second data to generate a first prediction regarding a likelihood of a first communication device engaging in a communication session in an area coinciding with the gap, determining, in accordance with the first prediction, that the likelihood is greater than a first threshold, and generating, in accordance with the determining that the likelihood is greater than the first threshold, a first ad-hoc network to extend the coverage to the area. Virtualized communication network 300 can facilitate in whole or in part processing first data to identify a coverage within an area of a network that is likely to be less than a first threshold at a first point in time, resulting in a first identification, processing second data to identify an application that is likely to be executed by a user equipment in the area at the first point in time in an amount that is greater than a second threshold, resulting in a second identification, and generating a first ad-hoc network to extend the coverage in accordance with the first identification and the second identification. Virtualized communication network 300 can facilitate in whole or in part generating, at a first point in time, a first prediction regarding a likelihood that a communication device will attempt to connect to a service of a network at a second point in time that is subsequent to the first point in time, generating, at a third point in time that is prior to the second point in time, a second prediction regarding a scope of coverage of the network at the second point in time, and generating, by the processing system, a first ad-hoc network, modifying, by the processing system, a parameter of a second ad-hoc network, or a combination thereof, in accordance with the first prediction and the second prediction to extend the scope of coverage.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
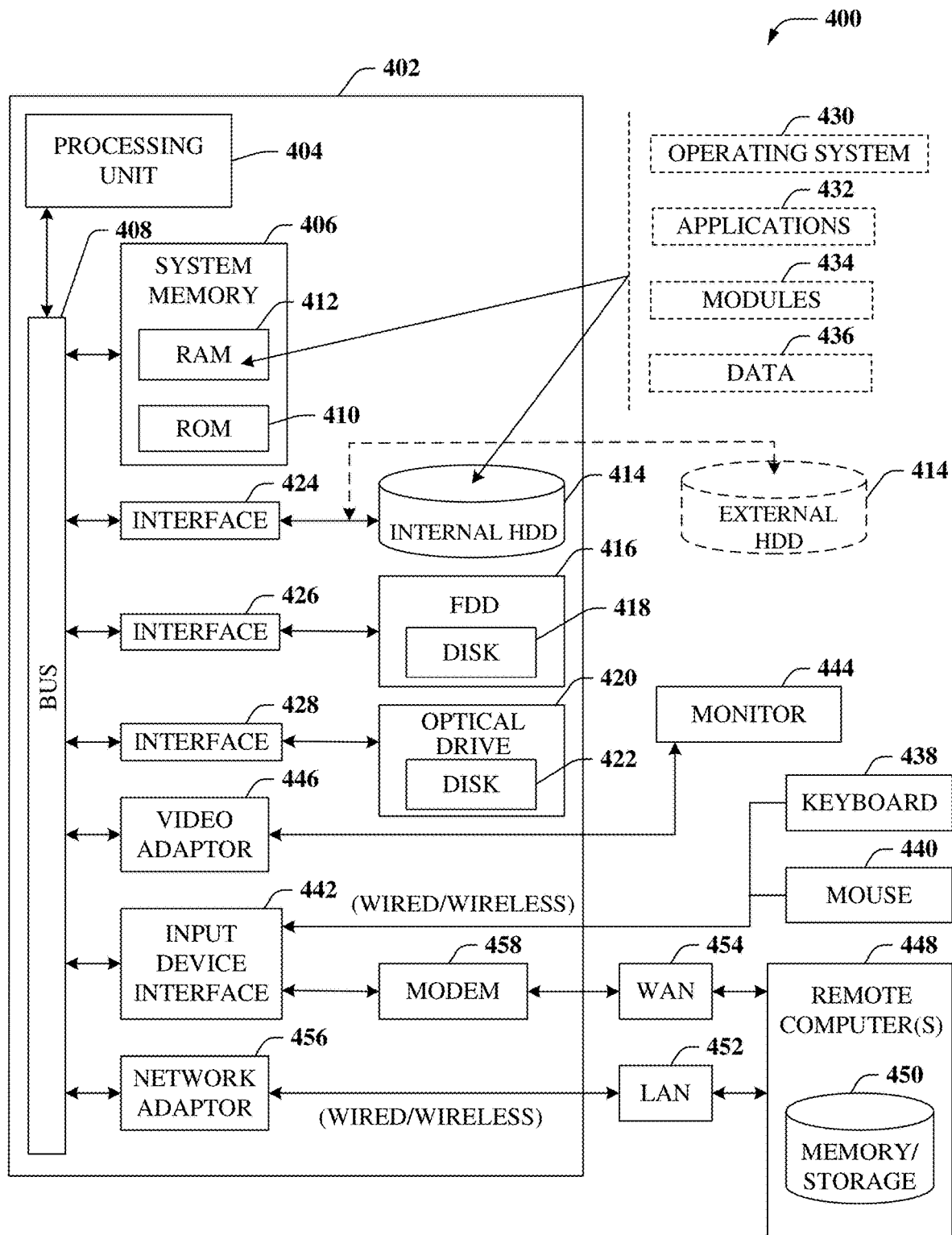
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining first data and second data, analyzing the first data to identify a gap in a coverage of a network, analyzing the second data to generate a first prediction regarding a likelihood of a first communication device engaging in a communication session in an area coinciding with the gap, determining, in accordance with the first prediction, that the likelihood is greater than a first threshold, and generating, in accordance with the determining that the likelihood is greater than the first threshold, a first ad-hoc network to extend the coverage to the area. Computing environment 400 can facilitate in whole or in part processing first data to identify a coverage within an area of a network that is likely to be less than a first threshold at a first point in time, resulting in a first identification, processing second data to identify an application that is likely to be executed by a user equipment in the area at the first point in time in an amount that is greater than a second threshold, resulting in a second identification, and generating a first ad-hoc network to extend the coverage in accordance with the first identification and the second identification. Computing environment 400 can facilitate in whole or in part generating, at a first point in time, a first prediction regarding a likelihood that a communication device will attempt to connect to a service of a network at a second point in time that is subsequent to the first point in time, generating, at a third point in time that is prior to the second point in time, a second prediction regarding a scope of coverage of the network at the second point in time, and generating, by the processing system, a first ad-hoc network, modifying, by the processing system, a parameter of a second ad-hoc network, or a combination thereof, in accordance with the first prediction and the second prediction to extend the scope of coverage.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
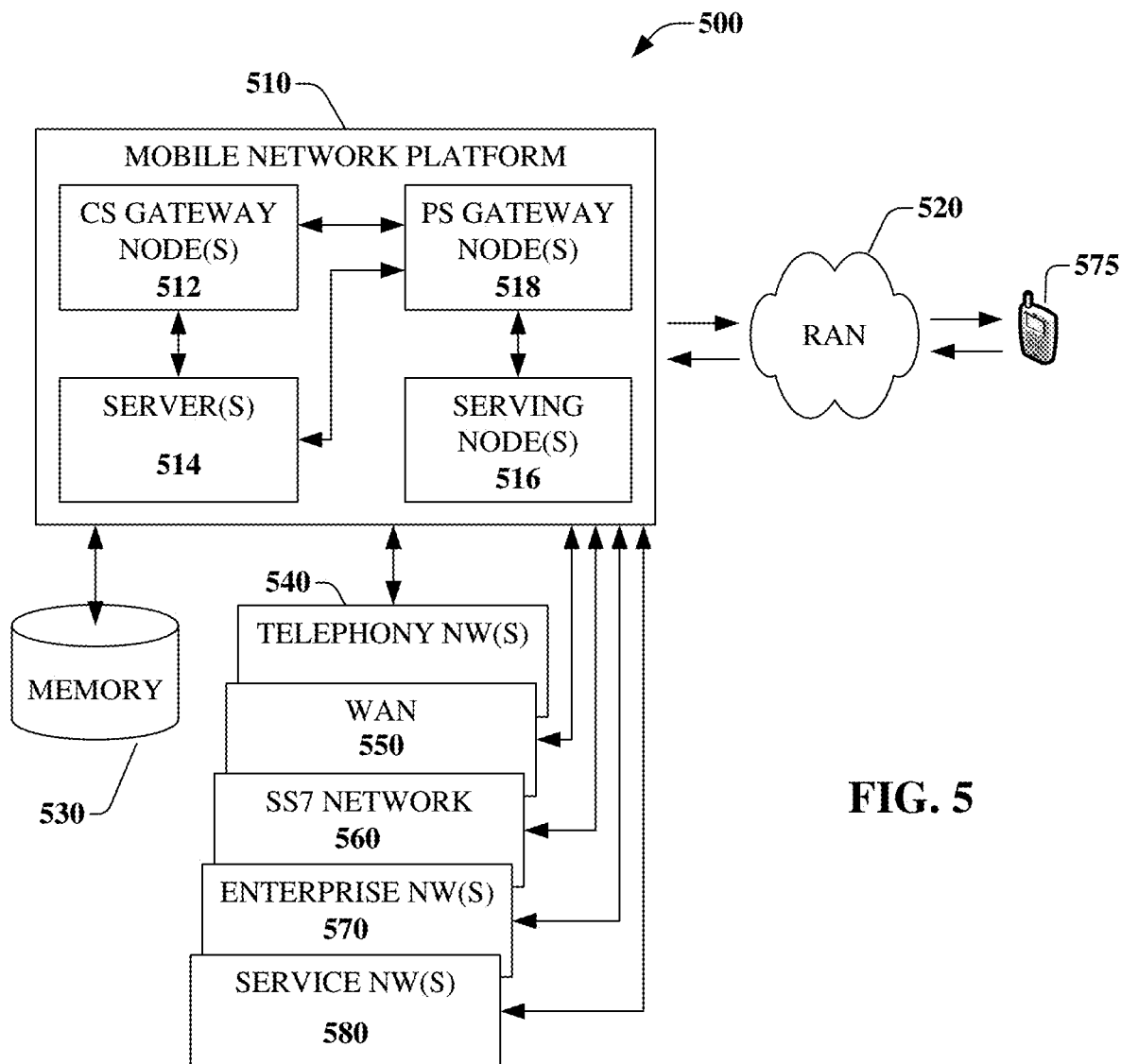
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining first data and second data, analyzing the first data to identify a gap in a coverage of a network, analyzing the second data to generate a first prediction regarding a likelihood of a first communication device engaging in a communication session in an area coinciding with the gap, determining, in accordance with the first prediction, that the likelihood is greater than a first threshold, and generating, in accordance with the determining that the likelihood is greater than the first threshold, a first ad-hoc network to extend the coverage to the area. Platform 510 can facilitate in whole or in part processing first data to identify a coverage within an area of a network that is likely to be less than a first threshold at a first point in time, resulting in a first identification, processing second data to identify an application that is likely to be executed by a user equipment in the area at the first point in time in an amount that is greater than a second threshold, resulting in a second identification, and generating a first ad-hoc network to extend the coverage in accordance with the first identification and the second identification. Platform 510 can facilitate in whole or in part generating, at a first point in time, a first prediction regarding a likelihood that a communication device will attempt to connect to a service of a network at a second point in time that is subsequent to the first point in time, generating, at a third point in time that is prior to the second point in time, a second prediction regarding a scope of coverage of the network at the second point in time, and generating, by the processing system, a first ad-hoc network, modifying, by the processing system, a parameter of a second ad-hoc network, or a combination thereof, in accordance with the first prediction and the second prediction to extend the scope of coverage.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS).

Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
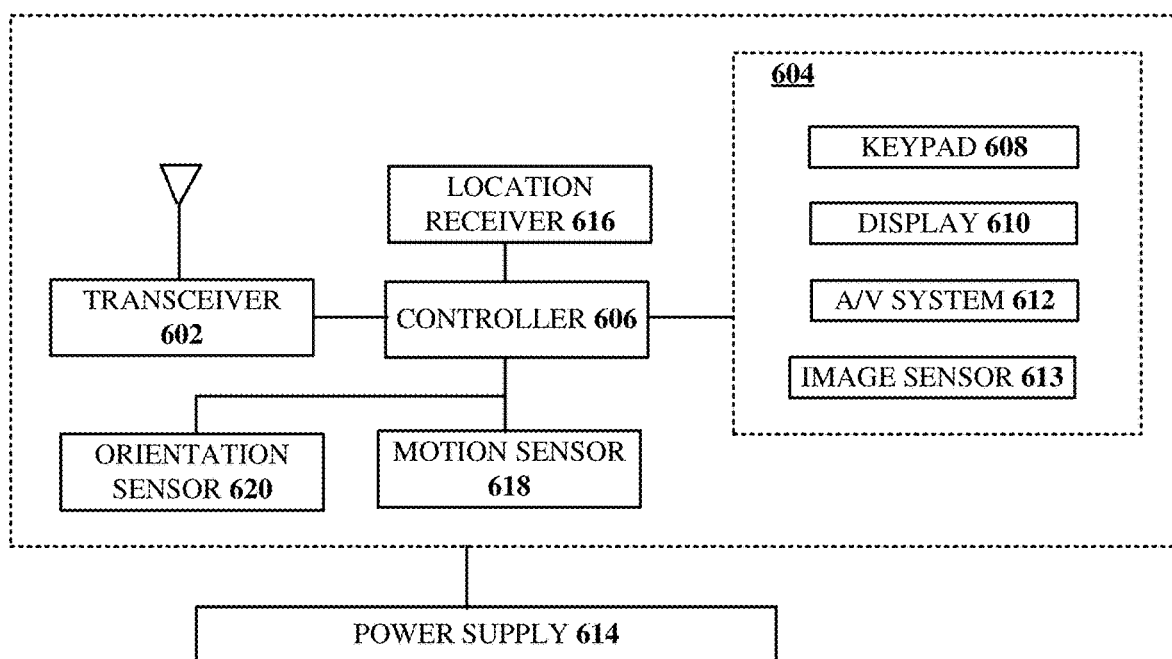
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining first data and second data, analyzing the first data to identify a gap in a coverage of a network, analyzing the second data to generate a first prediction regarding a likelihood of a first communication device engaging in a communication session in an area coinciding with the gap, determining, in accordance with the first prediction, that the likelihood is greater than a first threshold, and generating, in accordance with the determining that the likelihood is greater than the first threshold, a first ad-hoc network to extend the coverage to the area. Computing device 600 can facilitate in whole or in part processing first data to identify a coverage within an area of a network that is likely to be less than a first threshold at a first point in time, resulting in a first identification, processing second data to identify an application that is likely to be executed by a user equipment in the area at the first point in time in an amount that is greater than a second threshold, resulting in a second identification, and generating a first ad-hoc network to extend the coverage in accordance with the first identification and the second identification. Computing device 600 can facilitate in whole or in part generating, at a first point in time, a first prediction regarding a likelihood that a communication device will attempt to connect to a service of a network at a second point in time that is subsequent to the first point in time, generating, at a third point in time that is prior to the second point in time, a second prediction regarding a scope of coverage of the network at the second point in time, and generating, by the processing system, a first ad-hoc network, modifying, by the processing system, a parameter of a second ad-hoc network, or a combination thereof, in accordance with the first prediction and the second prediction to extend the scope of coverage.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via a observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining first data and second data;
analyzing the first data to identify a gap in a coverage of a network;
analyzing the second data to generate a first prediction regarding a likelihood of a first communication device engaging in a communication session in an area coinciding with the gap;
determining, in accordance with the first prediction, that the likelihood is greater than a first threshold; and
generating, in accordance with the determining that the likelihood is greater than the first threshold, a first ad-hoc network to extend the coverage to the area, wherein the first ad-hoc network comprises a second communication device and a third communication device, wherein each of the second communication device and the third communication device is communicatively coupled to a mobile edge computing (MEC) device of the network, and wherein each of the second communication device and the third communication device is communicatively coupled to the first communication device.

2. The device of claim 1, wherein the analyzing of the first data comprises identifying an extent of the gap in the coverage, and wherein the generating of the first ad-hoc network is in accordance with the identifying of the extent of the gap.

3. The device of claim 1, wherein the generating of the first ad-hoc network comprises assigning a value for a parameter of the second communication device included in the first ad-hoc network.

4. The device of claim 3, wherein the parameter pertains to a transmission power level, a frequency band, a modulation scheme, an encryption scheme, a multiple-input multiple-output (MIMO) scheme, a radio access technology (RAT) scheme, or any combination thereof.

5. The device of claim 1, wherein the analyzing of the first data to identify the gap in the coverage comprises identifying an obstruction in the area.

6. The device of claim 5, wherein the first data comprises imagery of the area, and wherein the identifying of the obstruction comprises performing an image processing algorithm on the imagery.

7. The device of claim 1, wherein the first data comprises a historical record regarding a plurality of communication sessions in the area.

8. The device of claim 1, wherein the first data comprises a real-time record regarding a plurality of communication sessions in the area.

9. The device of claim 1, wherein the analyzing of the first data to identify the gap in the coverage comprises identifying an interference level in the area, a noise level in the area, or a combination thereof.

10. The device of claim 1, wherein the second data comprises data obtained from a schedule of a user of the first communication device.

11. The device of claim 1, wherein the second data is associated with a message that is transmitted or received by the first communication device.

12. The device of claim 1, wherein the operations further comprise:
disbanding the first ad-hoc network subsequent to the generating of the first ad-hoc network.

13. The device of claim 12, wherein the disbanding of the first ad-hoc network comprises reducing an operating state of the second communication device of the first ad-hoc network.

14. The device of claim 1, wherein the operations further comprise:
generating, in accordance with the determining that the likelihood is greater than the first threshold, a second ad-hoc network to further extend the coverage.

15. The device of claim 14, wherein the first ad-hoc network is operative in accordance with a first radio access technology (RAT), and wherein the second ad-hoc network is operative in accordance with a second RAT that is different from the first RAT.

16. A non-transitory machine-readable medium, comprising executable instructions that, when executed by a processing system including a processor, facilitate performance of operations, the operations comprising:
obtaining first data and second data;
analyzing the first data to identify a gap in a coverage of a network;
analyzing the second data to generate a first prediction regarding a likelihood of a first communication device engaging a communication service in an area coinciding with the gap;
determining, in accordance with the first prediction, that the likelihood is greater than a first threshold; and
generating, in accordance with the determining that the likelihood is greater than the first threshold, a first ad-hoc network to extend the coverage to the area, wherein the first ad-hoc network comprises a second communication device and a third communication device, wherein each of the second communication device and the third communication device is communicatively coupled to a mobile edge computing (MEC) device of the network, and wherein each of the second communication device and the third communication device is communicatively coupled to the first communication device.

17. The non-transitory machine-readable medium of claim 16, wherein each of the second communication device and the third communication device comprises a server, a desktop computer, a laptop computer, a tablet, a gateway, a router, a switch, a modem, a mobile phone, an Internet of Things (IoT) device, a camera, a sensor, or any combination thereof.

18. A method, comprising:
analyzing, by a processing system including a processor, first data to identify a gap in a coverage of a network;
analyzing, by the processing system, second data to generate a first prediction regarding a likelihood of a first user equipment engaging a communication service in an area coinciding with the gap; and
generating, by the processing system and in accordance with the first prediction, a first ad-hoc network to extend the coverage to the area, wherein the first ad-hoc network comprises a second user equipment and a third user equipment, wherein each of the second user equipment and the third user equipment is communicatively coupled to a mobile edge computing (MEC) device of the network, and wherein each of the second user equipment and the third user equipment is communicatively coupled to the first user equipment.

19. The method of claim 18, further comprising generating, by the processing system, a first score representative of a confidence in the first prediction, wherein the generating of the first ad-hoc network is based on the first score.

20. The method of claim 19, further comprising assigning, by the processing system, a value for a parameter of the second user equipment included in the first ad-hoc network, wherein the parameter pertains to a transmission power level, a frequency band, a modulation scheme, an encryption scheme, a multiple-input multiple-output (MIMO) scheme, a radio access technology (RAT) scheme, or any combination thereof.

* * * * *